US007076653B1

(12) United States Patent
Remer et al.

(10) Patent No.: US 7,076,653 B1
(45) Date of Patent: Jul. 11, 2006

(54) SYSTEM AND METHOD FOR SUPPORTING MULTIPLE ENCRYPTION OR AUTHENTICATION SCHEMES OVER A CONNECTION ON A NETWORK

(75) Inventors: Eric B. Remer, American Fork, UT (US); David A. King, Highland, UT (US); David L. Remer, Orem, UT (US)

(73) Assignee: Intel Corporation, Santa Clara, CA (US)

(*) Notice: Subject to any disclaimer, the term of this patent is extended or adjusted under 35 U.S.C. 154(b) by 1067 days.

(21) Appl. No.: 09/604,184

(22) Filed: Jun. 27, 2000

(51) Int. Cl.
*H04L 9/00* (2006.01)
*G06F 9/00* (2006.01)
*G06F 15/16* (2006.01)
*G06F 17/00* (2006.01)

(52) U.S. Cl. ............... 713/155; 713/168; 726/12; 726/14

(58) Field of Classification Search ................ 713/155, 713/153
See application file for complete search history.

(56) References Cited

U.S. PATENT DOCUMENTS

| 5,434,918 A | * | 7/1995 | Kung et al. ............... 713/169 |
| 5,966,448 A | * | 10/1999 | Namba et al. ............. 380/33 |
| 6,104,711 A | * | 8/2000 | Voit .......................... 370/352 |
| 6,138,037 A | * | 10/2000 | Jaamies ..................... 455/560 |
| 6,334,142 B1 | * | 12/2001 | Newton et al. ............. 709/206 |
| 6,351,776 B1 | * | 2/2002 | O'Brien et al. ............ 709/245 |
| 6,691,232 B1 | * | 2/2004 | Wood et al. ................ 713/201 |
| 6,714,982 B1 | * | 3/2004 | McDonough et al. ...... 709/228 |
| 2003/0167403 A1 | * | 9/2003 | McCurley et al. .......... 713/201 |

* cited by examiner

*Primary Examiner*—Gilberto Barrón, Jr.
*Assistant Examiner*—Christopher J. Brown
(74) *Attorney, Agent, or Firm*—Steven P. Skabrat

(57) ABSTRACT

A system and method for establishing a secure connection with an entity protected by an access control mechanism. A trusted arbitrator is used as an intermediary between a computer network employing the access control mechanism and external entities seeking to communicate securely with an entity inside the computer network. Connection requests for establishing a secure connection from an external entity are routed to the trusted arbitrator, which interacts with both the external entity and entities within the computer network. A secure connection is established between the external entity and the trusted arbitrator. Another secure connection is established between the entities within the computer network and the trusted arbitrator. The trusted arbitrator decrypts and encrypts from one connection to another, allowing the external entity to communicate securely with the computer network. Because the trusted arbitrator may support multiple authentication and/or encryption schemes, secure communication can be achieved even if the external entity and the computer network do not support the same authentication and/or encryption schemes.

26 Claims, 6 Drawing Sheets

SYSTEM AND METHOD FOR SUPPORTING MULTIPLE ENCRYPTION OR AUTHENTICATION SCHEMES OVER A CONNECTION ON A NETWORK

BACKGROUND OF THE INVENTION

1. Field of the Invention

The present invention relates to establishing a secure connection with a device on a network, and in particular, to systems and methods for supporting multiple encryption/authentication schemes from a source entity to a target entity protected by an access control mechanism and communicating securely between the two entities over the Internet.

2. Related Art

Computer networks, such as a local area network (LAN), wide area network (WAN) or other Ethernet-based systems facilitate communications among systems of computers. These systems may be connected to each other, and possibly to terminals and other peripheral devices, by physical and/or wireless communications lines. Each entity on a network may be generally classified as a 'client' (i.e. an entity that initiates requests) or a 'server' (i.e. an entity that receives and responds to requests), although a single entity may also perform different roles at different times. Transfers of information across the network are typically conducted in compliance with one or more network protocols to ensure that the information may be properly delivered and interpreted. One such protocol is the Hypertext Transfer Protocol or HTTP, an application-level protocol that provides a basis for information transfer across the Internet. As shown in FIG. 1, HTTP is a query/response protocol in which an entity such as a client 30 directs a query for information to a specific resource (such as a file or web page, as identified by a Universal Resource Locator or URL) and another entity such as a server 40 forwards an appropriate response associated with that resource.

A LAN allows computers or terminals that are located near one another to share resources such as storage devices, printers, and other peripheral equipment. A LAN that is connected to a larger network may include one or more access points (or 'gateways') through which devices within the LAN may communicate with devices outside the LAN. Access control mechanisms (or 'ACMs') provide security against unauthorized access to the LAN by controlling or restricting the flow of information across the access points. FIG. 2, for example, shows a LAN 230 that is connected to the Internet 250 only through an ACM 20a. Due to the presence of ACM 20a at this access point, a remote computer 20c that is connected to the Internet 250 may not freely interact with devices connected to LAN 230 such as computer 10a. Any request for information that is sent by remote computer 20c to computer 10a will be scrutinized by ACM 20a and may be rejected.

One type of ACM is a firewall, which is a protective layer that separates a computer network from external network traffic. This layer may be implemented in software, hardware, or any combination of the two. For example, firewall application software may be installed on a server to create a combination called a 'firewall server.' Another type of ACM is a server running an application program that evaluates incoming requests according to a predefined set of rules (also called 'packet filtering'). Such a device is called a 'proxy server' or simply a 'proxy.' To entities outside the network, the proxy may act as a server, receiving and evaluating incoming transmissions. To devices within the network, the proxy may act as a client, forwarding the incoming transmissions that conform to its rules.

Unfortunately, the characteristics that make firewalls or proxies effective in controlling the flow of information into the network also lead to increased complexity and cost. For example, when a source entity outside the LAN seeks to be connected with a target entity within the LAN, complex modifications and/or costly changes to the ACM may be necessary to permit the connection. In addition, significant processing resources are consumed in evaluating all gateway traffic to ensure compliance with the network's security rules and thereby protect the network from potentially harmful traffic.

Some solutions to these problems of overhead—such as setting aside a dedicated, open port in the firewall through which external traffic may enter—may create unacceptable security risks. Other, more secure solutions include virtual private networks (VPNs), which use encryption to allow users on different networks to exchange information with each other in a secure manner over the Internet. This encryption effectively creates a secure "tunnel" between sender and receiver so that even though the information may pass through many other entities during transmission, it is accessible only to the sender and the receiver.

Although a VPN offers a higher level of data security, no reduction in overhead processing is thereby achieved, as network traffic entering the LAN through the VPN must still pass through and be evaluated by the ACM. Adding a VPN to an existing network also involves a significant investment in resources and may introduce bugs or errors into a stable system. It is desirable to reduce or avoid these costs and risks.

Furthermore, a VPN presents the problem of requiring all the entities that belong to it to use the same authentication and encryption schemes when the entities wish to communicate with each other in a secure manner. A VPN does not support multiple encryption and/or authentication schemes that may be utilized in a connection between a source entity and a target entity over the Internet. Therefore, there is a need for a system and a method to support multiple encryption and/or authentication schemes over a connection over the Internet, allowing entities that utilize different encryption and/or authentication schemes to be securely connected.

DETAILED DESCRIPTION

Figure 1:
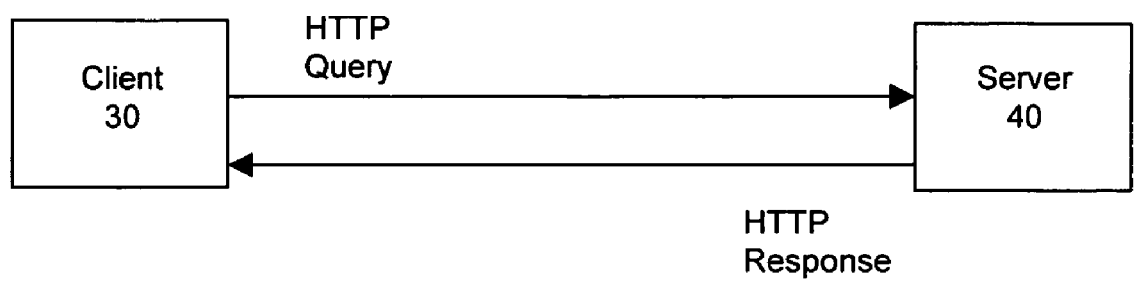
FIG. 1 illustrates the flow of data in an HTTP query and response system.
Figure 2:
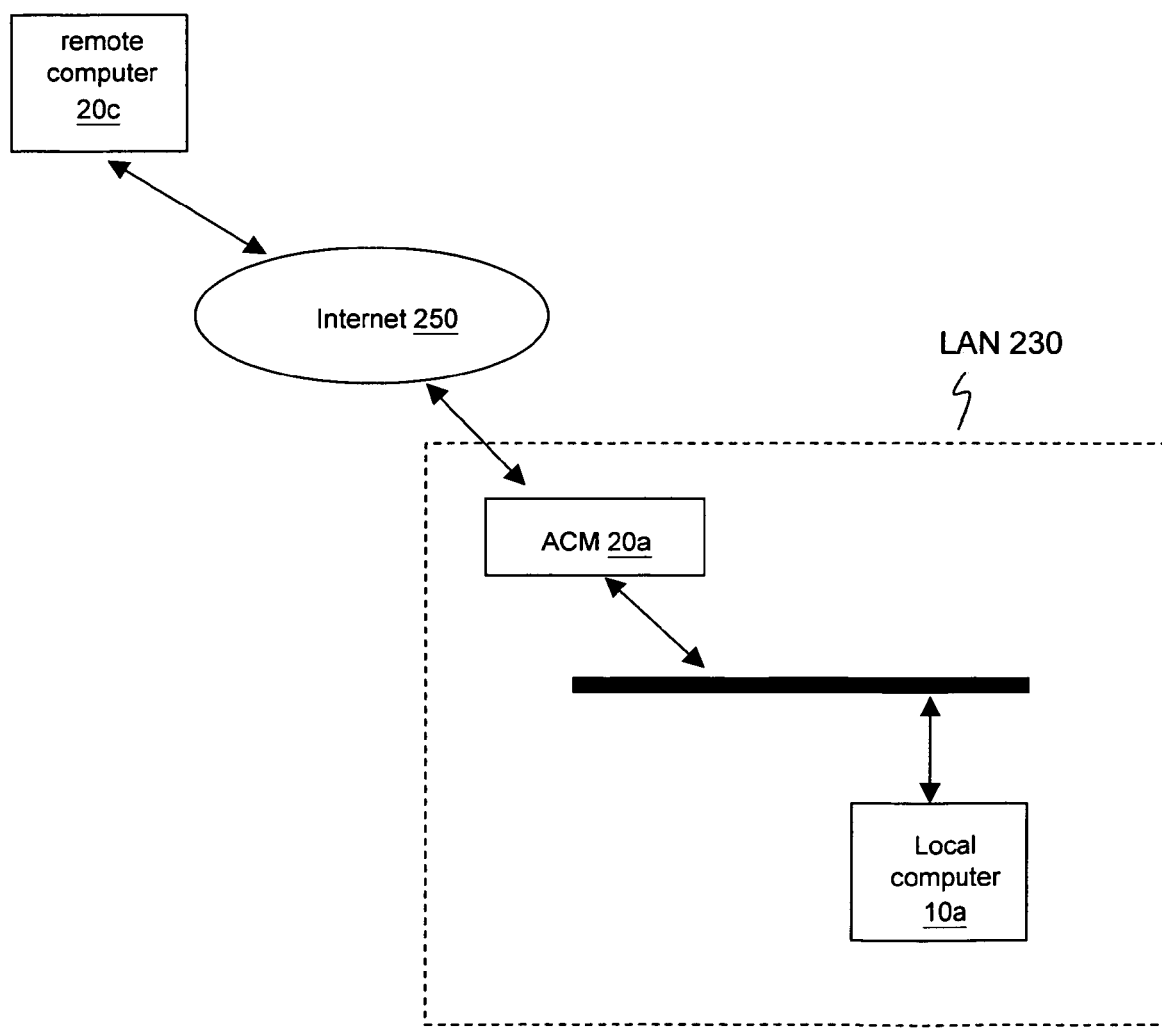
FIG. 2 shows a conventional system including a local area network and a remote computer.
Figure 3:
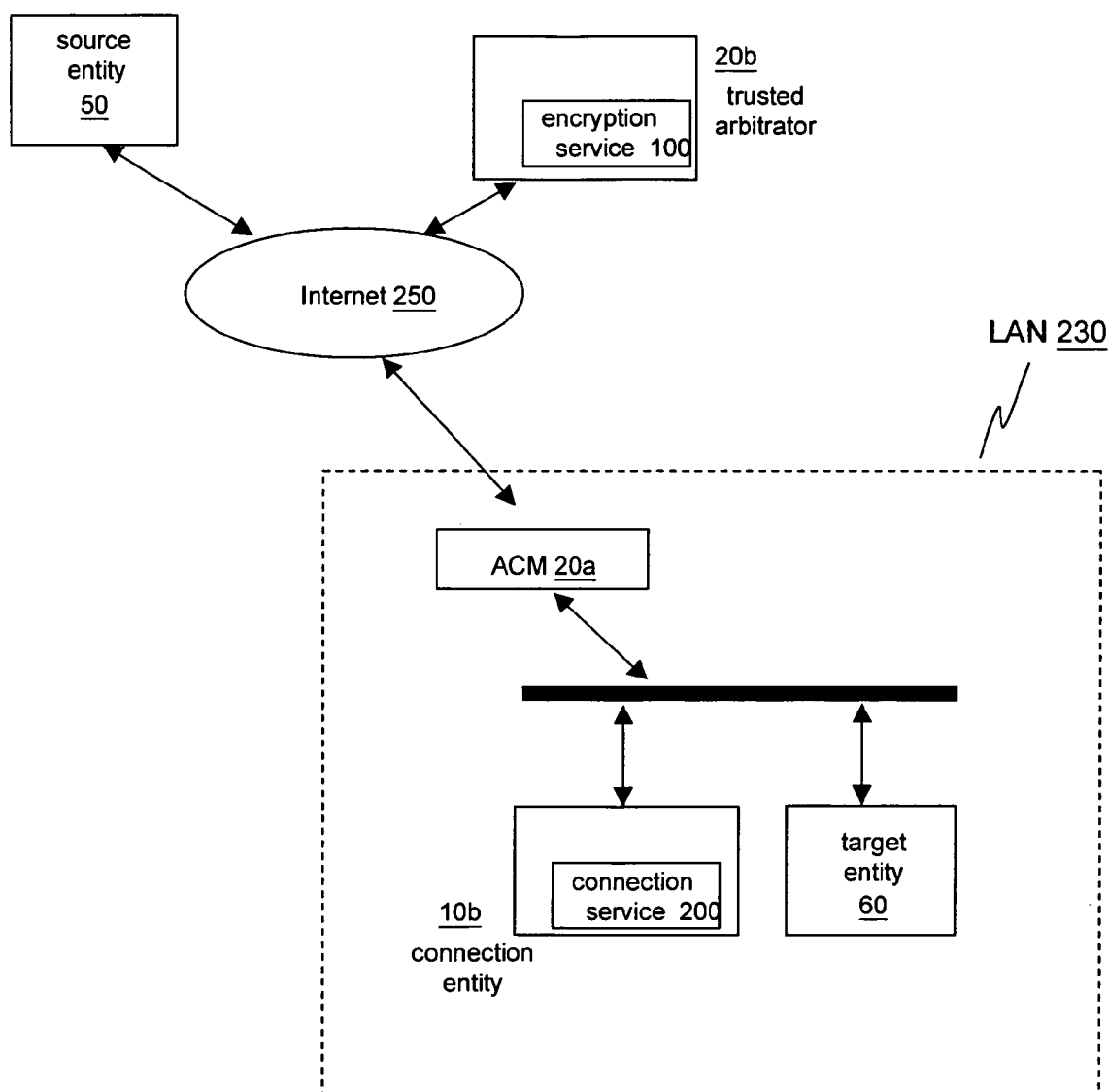
FIG. 3 shows a system for communicating over a secure connection on a network according to an embodiment of the invention.

Embodiments of the present invention are directed to systems and methods of supporting multiple encryption or authentication schemes over a connection on a network. FIG. 3 shows an overall perspective view of a first embodiment of the invention. A source entity 50 is connected to a network such as the Internet 250. A computer network such as a LAN 230 comprises various components including a target entity 60 and a connection entity 10b. Other components such as additional computers, printers, and file servers may also be connected to the LAN 230. The LAN 230 is connected to an external network (here, the Internet 250) through an ACM 20a, which protects components within the LAN 230 from external network traffic by intercepting communication requests that are sent directly to these components from entities in the external network.

A trusted arbitrator 20b is also connected to the Internet 250. Subject to the restrictions dictated by the ACM 20a, information may thereby flow among entities connected to the LAN 230, the source entity 50 and the trusted arbitrator 20b. The entities may be any device or process that originates or terminates a request for information. For example, an entity may be implemented with a LAN, a computer, an application program, or an embedded processor.

In one embodiment, one of the entities connected to the LAN 230 is the connection entity 10b, which interacts with the trusted arbitrator 20b regarding communication requests and secure connection requests sent by the external entities (such as the source entity 50) to devices within the LAN 230. The connection entity 10b may reside on a device such as a router, on a dedicated computer, or on a computer that performs other tasks as well. For example, the ACM 20a and the connection entity 10b may reside on the same entity. In another embodiment, the connection entity 10b may be replaced by a connection service provided by an entity within the LAN 230 behind the ACM 20a. The platform on which the connection service resides is irrelevant. For example, the connection service may reside on a computer or a specialized application. Regardless of the form of the connection entity 10b and the connection service, the trusted arbitrator 20b communicates with the connection entity 10b or the entity employing the connection service to receive requests from one or more external entities (such as the source entity 50), such requests being directed to one or more entities within the LAN 230 (such as target entity 60). Moreover, the trusted arbitrator 20b also supports multiple authentication and/or encryption schemes to allow a secure connection between an external entity and an entity within the LAN 230 to be established even when the external entity and the entity within the LAN 230 utilize different authentication and/or encryption schemes.

According to an embodiment of the invention, the source entity 50 sends a request for establishing a secure connection between the source entity 50 and the target entity 60 to the trusted arbitrator 20b over the Internet 250, rather than directly to the target entity 60 through the ACM 20a. Such request for establishing a secure connection may, for example, be in response to a user's keyboard or mouse requests, or directed by an application program, or in response to a request by a client within a LAN that includes the source entity 50. In one implementation, the source entity 50 sends the request to the trusted arbitrator 20b through the arbitrator's website, which is accessed by using its Universal Resource Locator (URL). The source entity 50 supplies the trusted arbitrator 20b with information regarding the request, e.g., the identity or location of the LAN 230, the nature of the request for establishing a secure connection, and the particular entity within the LAN 230 to which the request for establishing a secure connection is directed. The connection entity 10b may also exchange information with the trusted arbitrator 20b through this or another URL associated with the trusted arbitrator 20b.

Upon receiving the request, the trusted arbitrator 20b attempts to authenticate with the source entity 50 whether a desired authentication scheme utilized by the source entity 50 is supported. Authentication is needed to confirm the identity of the source entity 50. The authentication scheme may, for example, be implemented by a password-based authentication process. It may also be implemented by a certificate-based or other type of authentication process. In one implementation, the trusted arbitrator 20b confirms the identity of the source entity 50 through a name and password combination provided by a user at the source entity 50. In another implementation, the identity of the source entity 50 is authenticated by having the source entity 50 digitally sign a randomly generated piece of data and send both the certificate and the signed data across the network. The trusted arbitrator 20b uses techniques of public-key cryptography to validate the signature and confirm the validity of the certificate. In this way, the identification is confirmed. In one embodiment, the trusted arbitrator 20b assigns an authentication identity to source entity 50 upon certification of the request sent by the source entity 50. In another embodiment, trusted arbitrator 20b certifies the request by verifying that the source entity 50 is capable of transmitting and receiving information in a secure manner. By virtue of authentication, an impostor may not assume the identity of the source entity 50 without running afoul of the trusted arbitrator 20b.

Once the source entity 50 is authenticated, the trusted arbitrator 20b evaluates the secure connection request, which includes information regarding a particular encryption scheme (hereinafter referred to as "encryption scheme X") which the source entity wishes to employ in establishing the secure connection. Within the trusted arbitrator, an encryption service 100 may be implemented to deal specifically with secure connection requests and to support multiple encryption schemes. In one implementation, the encryption service 100 in the trusted arbitrator 20b determines if the multiple encryption schemes supported by the encryption service 100 include encryption scheme X. If the encryption service 100 supports encryption scheme X, a secured connection is established between the source entity 50 and the trusted arbitrator 20b using encryption scheme X.

One example of the secured connection is established by using the Secure Sockets Layer (SSL) protocol, wherein all data sent over an encrypted SSL connection is protected. The SSL protocol allows an SSL-enabled server to authenticate itself to an SSL-enabled client, allows the client to authenticate itself to the server, and allows both the client and the server to establish an encrypted connection. The SSL protocol includes sub-protocols that define the format used to transmit data and involves using the SSL record to exchange a series of messages between an SSL-enabled server and an SSL-enabled client. This exchange of messages facilitates authenticating the server to the client, allowing the selection of the cryptographic algorithms, optionally authenticating the client to the server, using public-key encryption techniques to generate shared secrets, and establishing an encrypted SSL connection. Different cryptographic algorithms may be used, including Data Encryption Standard (DES), Digital Signature Algorithm (DSA), Key Exchange Algorithm (KEA), Message Digest algorithm (MD5), Rivest encryption ciphers (RC2), RSA, Secure Hash Algorithm (SHA-1) and triple-DES (DES3).

After a secure connection is formed between the source entity 50 and the trusted arbitrator 20b using encryption scheme X, the trusted arbitrator 20b then attempts to form a secure connection between the trusted arbitrator 20b and the LAN 230. This will effectively create secure connectivity between the source entity 50 and the target entity 60. However, because of the ACM 20a, a secure connection request sent directly from the source entity 50 to the LAN 230 or the trusted arbitrator 20b to the LAN 230 will not be received. The ACM 20a requires a communication channel between the trusted arbitrator 20b and the entities within the LAN 230 be opened from inside of the LAN 230. In one implementation, the connection entity 10b within LAN 230 periodically checks for secure connection requests by sending an HTTP query to the trusted arbitrator 20b. This opens a HTTP channel, allowing the trusted arbitrator 20b to respond by a HTTP response to inform the connection entity 10b that connection requests for establishing a secure connection between the source entity 50 and the target entity 60 exist in the trusted arbitrator 20b. Because this HTTP response is associated with an HTTP query that the connection entity 10b initiated, it passes through the ACM 20a without being evaluated. In one embodiment, the trusted arbitrator 20b informs the connection entity 10b that a secure connection between the connection entity 10b and itself is required.

Upon receiving information indicating that connection requests are present in the trusted arbitrator 20b, the connection entity 10b attempts to establish a secure connection between the trusted arbitrator 20b and the LAN 230. In one embodiment, the trusted arbitrator 20b authenticates the LAN 230. For example, the trusted arbitrator 20b software may use standard techniques of public-key cryptography to check that the certificate and public ID of the LAN 230 are valid and have been issued by a certificate authority (CA) listed in the list of trusted CAs of the trusted arbitrator 20b. In another embodiment, authentication by the LAN 230 to confirm the identity of the trusted arbitrator 20b is performed. For example, the LAN 230 may authenticate the communication on the basis of a shared secret known to the LAN 230 and the trusted arbitrator 20b.

Once authenticated, the connection entity 10b requests a secure connection be established between the trusted arbitrator 20b and the LAN 230 using a particular encryption scheme (hereinafter referred to as encryption scheme Y) employed by the connection entity 10b. Herein, the encryption scheme used by LAN 230 is different from the encryption scheme used by the source computer 50, namely encryption scheme X. In one embodiment, the encryption service 100 in the trusted arbitrator 20b is implemented to support multiple encryption schemes and deal specifically with secure connection request. If the encryption service 100 supports encryption scheme Y, a secure connection is established between the trusted arbitrator 20b and LAN 230 using encryption scheme Y. In one implementation, the secure connection is established between the trusted arbitrator 20b and the connection entity 10b, with secured data, which is transmitted from the source entity 50 through the secure connections established by the trusted arbitrator 20b, being further transferred to the target entity 60. In another implementation, the secure connection is established between the trusted arbitrator 20b and the target entity 60.

Thus, a secure connection is established between the source entity 50 and the trusted arbitrator 20b using a first authentication scheme and encryption scheme X. A secure connection is also established between the trusted arbitrator 20b and the target entity 60 using a second authentication scheme and encryption scheme Y. With these two connections, the trusted arbitrator 20b virtually connects the source entity 50 and the target entity 60 in a secure manner. This allows secure connectivity between the source entity 50 and the target entity 60, both of which may be behind a respective firewall. Because the trusted arbitrator 20b supports multiple authentication and encryption schemes, source and target entities using completely different authentication and/or encryption techniques are able to communicate with each other.

Figure 4:
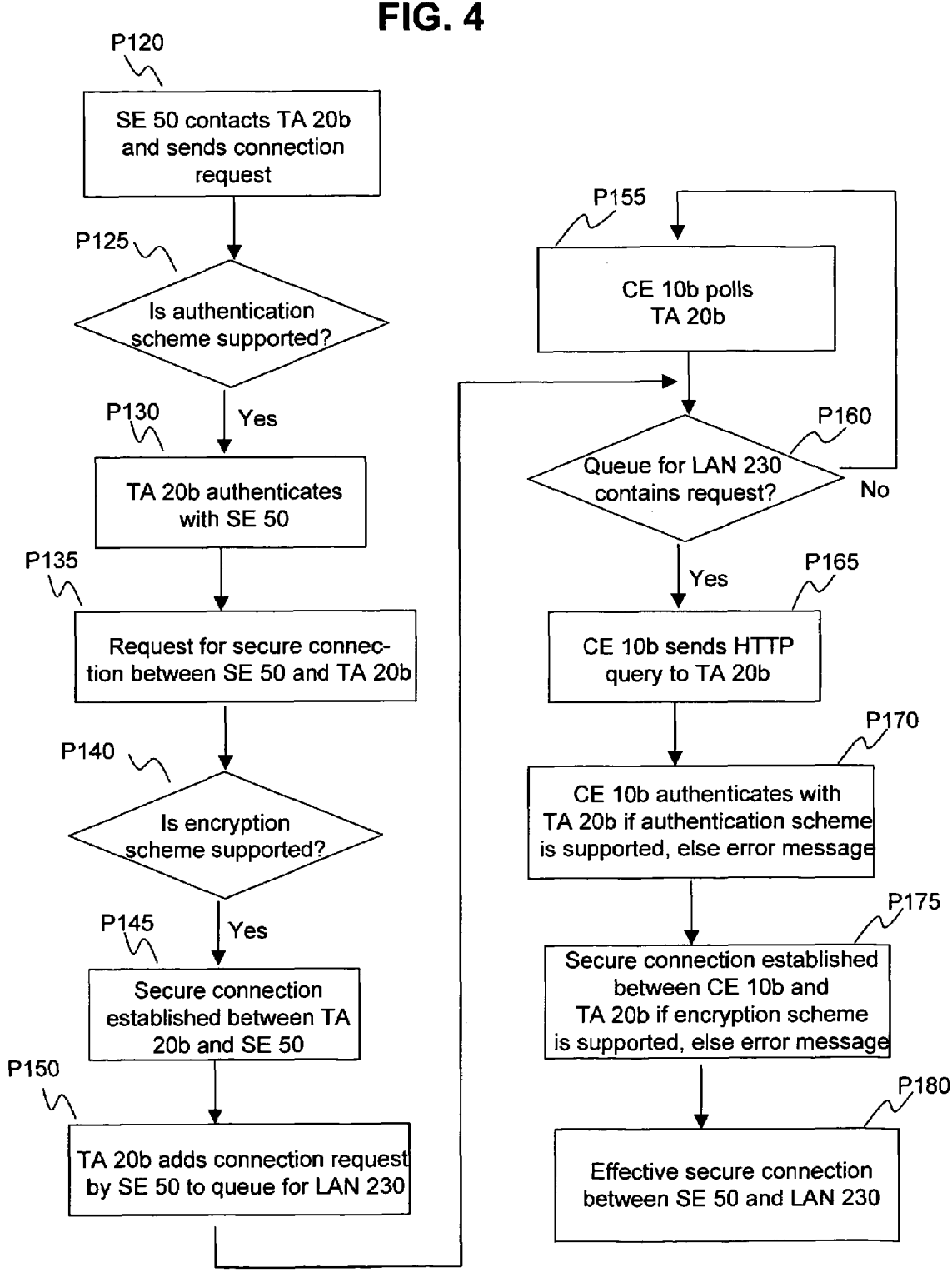
FIG. 4 illustrates processes for communicating over a secure connection on a network according to an embodiment of the present invention.

FIG. 4 illustrates processes for supporting multiple encryption and/or authentication schemes over a connection on a network according to an embodiment of the invention. One exemplary use of the processes occurs when a user wishes to manage entities, such as computers behind a firewall, from a remote point securely. Another exemplary use of the processes may involve general-purpose secure communications between computers behind different firewalls.

In block P120, a source entity 50 sends a connection request for establishing a secure connection between itself and a target entity 60 to the trusted arbitrator 20b. Upon receiving the request, the trusted arbitrator 20b authenticates the source entity 50. The trusted arbitrator 20b may certify the request by, for example, verifying the identity of the source entity 50. In one embodiment, the source entity 50 contacts the arbitrator service residing in the trusted arbitrator 20b and attempts to authenticate. The arbitrator service determines if the specific authentication scheme used by the source entity 50 is supported, as shown in block P125. In block P130, if the specific authentication scheme is supported, then the arbitrator service attempts to authenticate using that authentication scheme. In one implementation, the arbitrator service in the trusted arbitrator 20b may certify the request by verifying identification information that the source entity 50 forwarded along with the request for establishing a secure connection. If the specific authentication scheme is not supported or is otherwise unsuccessful in implementation, then the arbitrator service rejects the request. In one implementation, the arbitrator service returns an error message to the source entity 50.

Once authenticated, an attempt to establish a secure connection between the source entity 50 and the trusted arbitrator 20b is performed. In one embodiment, the source entity 50 sends out a request for a secure connection between the source entity 50 and the trusted arbitrator 20b, as shown in block P135. This request includes information regarding using encryption scheme X to establish the secure connection. In block P140, the trusted arbitrator 20b determines if it supports encryption scheme X. In one implementation, an encryption service 100 may be implemented to support multiple encryption schemes and deal specifically with the request. The encryption service 100 checks whether the multiple encryption schemes which it supports include encryption scheme X. If the encryption service 100 supports encryption scheme X, a secured connection is established between the source entity 50 and the trusted arbitrator 20b using encryption scheme X, as shown in block P145.

With the secure connection established by encryption scheme X, the trusted arbitrator 20b organizes the connection request for forwarding to the connection entity 10b. In one implementation, the trusted arbitrator 20b adds the connection request to a queue in a secure area within its website that may be designated for the LAN 230 or the connection entity 10b, as shown in block P150. The organization of this secure area may be dynamically reconfigurable to promote the efficient processing of requests originating from multiple remote entities and/or directed to multiple LANs. It should be noted that, in another implementation, the connection request may be organized for forwarding to the connection entity 10b before the secure connection is established.

As shown in block 155, the connection entity 10b regularly polls trusted arbitrator 20b to determine whether any connection request directed to devices within the LAN 230 are currently present or stored in the trusted arbitrator 20b. In one embodiment, the connection entity 10b polls the trusted arbitrator 20b by sending a HTTP query to its website. If no response indicating the presence of requests is received, the connection entity 10b waits for a predetermined delay period before polling the trusted arbitrator 20b again.

In block 160, it is determined whether the queue for the LAN 230 contains a connection request to connect with a device within the LAN 230 securely. If the trusted arbitrator 20b indicates that the connection request is currently present, then the connection entity 10b authenticates with the trusted arbitrator 20b and a secure connection between the trusted arbitrator 20b and the LAN 230 is established. In one embodiment, the connection entity 10b sends a HTTP query to the trusted arbitrator 20b to open a HTTP channel between the two entities, as shown in block P165. With an open communication channel, data exchanges for authentication and for establishing secure connection between the trusted arbitrator 20b and the LAN 230 are allowed. Because any response by the trusted arbitrator 20b to the HTTP query is associated with the HTTP query that the connection entity 10b initiated, it passes through the ACM 20a without being evaluated.

In block P170, the open communication channel allows the connection entity 10b to authenticate with the trusted arbitrator 20b if the desired authentication scheme is supported. In one implementation, client authentication may be employed to allow the trusted arbitrator 20b to confirm the identity of the connection entity 10b. In another implementation, server authentication may be employed to allow the connection entity 10b to confirm the identity of the trusted arbitrator 20b. If the desired authentication scheme is not supported or the process of authentication fails, an error message may be output. According to an embodiment, block P170 described above is similar to blocks P125 and P130. In block P170, instead of having the source entity 50 attempt to authenticate with the trusted arbitrator 20b, the connection entity 10b attempts to authenticate with the trusted arbitrator 20b.

Once authentication is completed, a secure connection between the trusted arbitrator 20b and the connection entity 10b is established if the encryption scheme used by the connection entity 10b is supported by the trusted arbitrator 20b, as shown in block P175. If the encryption scheme is supported, then a secure connection between the trusted arbitrator 20b and the LAN 230 is established. Here, it is assumed that this encryption scheme is different from encryption scheme X employed by the source entity 50. If the desired encryption scheme is not supported or the process of encryption fails, an error message may be output. According to an embodiment, block P175 is similar to blocks P135, P140 and P145. In block P175, instead of having the source entity 50 attempt to establish a secure connection with the trusted arbitrator 20b using encryption scheme X, the connection entity 10b attempts to establish a secure connection with the trusted arbitrator 20b using another encryption scheme.

In one embodiment, the secure connection between the trusted arbitrator 20b and the LAN 230 is established between the trusted arbitrator 20b and the connection entity 10b, wherein encrypted data sent from the trusted arbitrator 20b to the connection entity 10b is decrypted and forwarded to the target entity 60 by the connection 10b. In particular, the connection entity 10b routes the information within an HTTP response to the appropriate device within the LAN 230 (e.g., as indicated within the response). For example, if the response indicates that the information relates to records that are located on a storage medium of the target entity 60, connection entity 10b routes the information to the target entity 60 for processing. In another embodiment, the secure connection between the trusted arbitrator 20b and the LAN 230 is established between the trusted arbitrator 20b and the target entity 60 through the coordination of the connection entity 10b.

In block P180, once both secure connections are established between the source entity 50 and the trusted arbitrator 20b as well as between the trusted arbitrator 20b and the LAN 230, the trusted arbitrator 20b virtually connects the source entity and the LAN 230. This allows secure connectivity between the source entity 50 and the target entity 60 in the LAN 230. In one embodiment, the source entity may be a laptop or a computer trying to communicate with a computer inside of the LAN 230 securely. In another embodiment, both source and target entities may reside behind two different firewalls.

In one exemplary use, the source entity 50, such as a remote computer, may wish to send information securely to a target entity, such as a local computer behind a firewall, wherein the remote computer uses a first encryption scheme and the local computer uses a second encryption scheme. To send information securely, a secure connection between the remote computer and the local computer must first be established. To establish the secure connection, the remote computer may try to send an HTTP query for establishing a secure connection to the local computer. Because the remote computer is not known to the firewall, a query sent by the remote computer directly to the local computer will not reach its destination. Moreover, because the remote computer and the local computer use different encryption schemes, a secure connection cannot be achieved even if the HTTP query is accepted by the firewall. However, if the query is sent as a payload to an HTTP query by a trusted arbitrator that supports multiple encryption and/or authentication schemes as described above, the query will be admitted by the firewall and the secure connection can be established. Thus, the overhead of configuring the system to allow direct secure communication with the remote computer is avoided without comprising the security of the LAN 230.

In one implementation, the source computer contacts an encryption service in the trusted arbitrator and sets up a secure connection with a first encryption scheme. Through a connection service residing behind the firewall, the local computer also contacts the encryption service and sets up a secure connection with a second encryption scheme. The encryption service will decrypt and encrypt from one connection to another, allowing the source computer to communicate securely with the target computer even when the two do not support the same encryption techniques.

Figure 5:
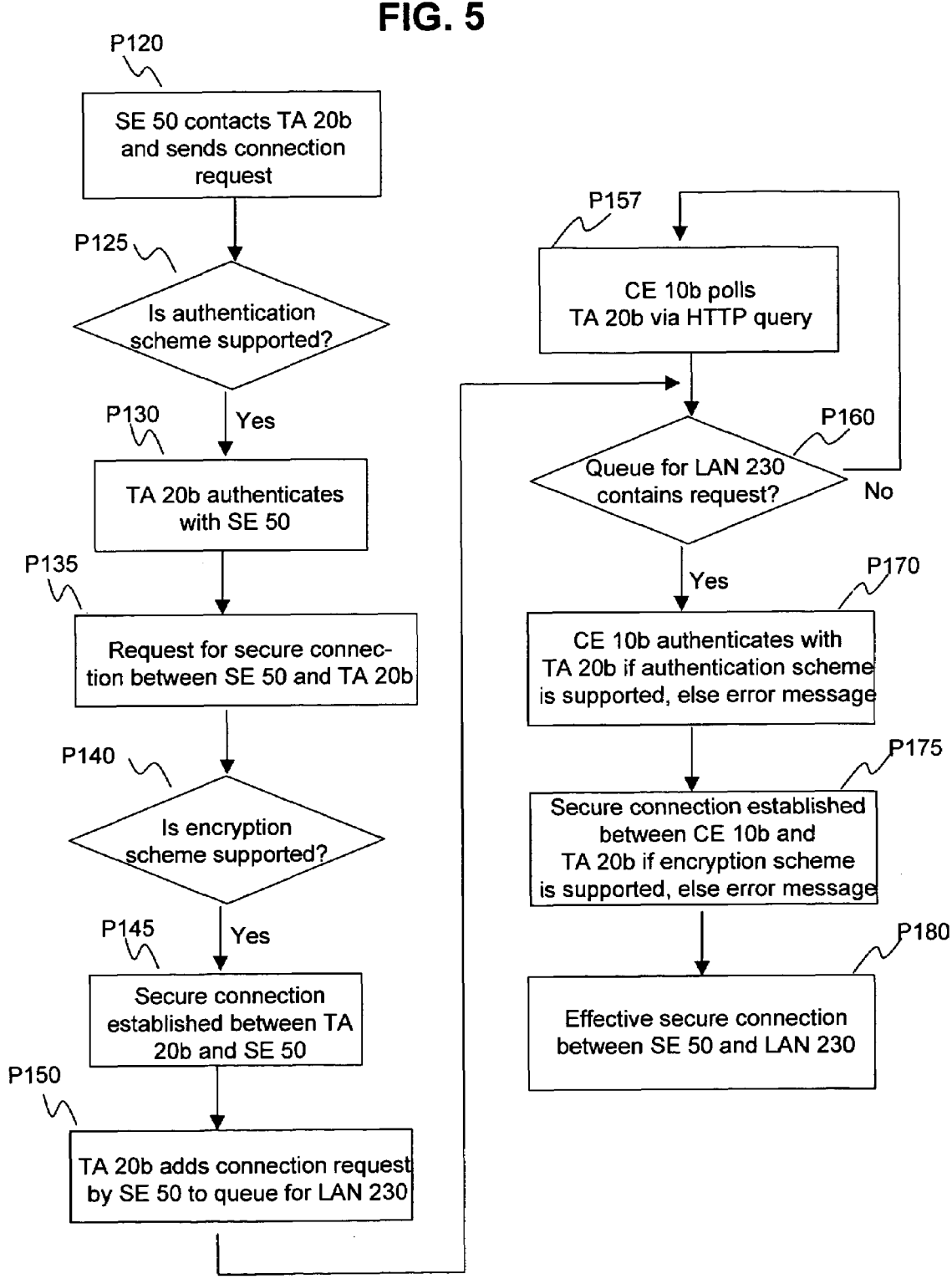
FIG. 5 shows a flow chart for an extension of a method according to an embodiment of the invention.

In an alternative embodiment as shown in FIG. 5, the connection entity 10b polls trusted arbitrator explicitly via a HTTP query (block P157). If the queue is empty, no response need be sent. If the queue contains a connection request for connecting securely with a device within the LAN 230, then the connection request or some data indicating the existence of such connection request is sent to the connection entity 10b immediately in a HTTP response to that query.

Figure 6:
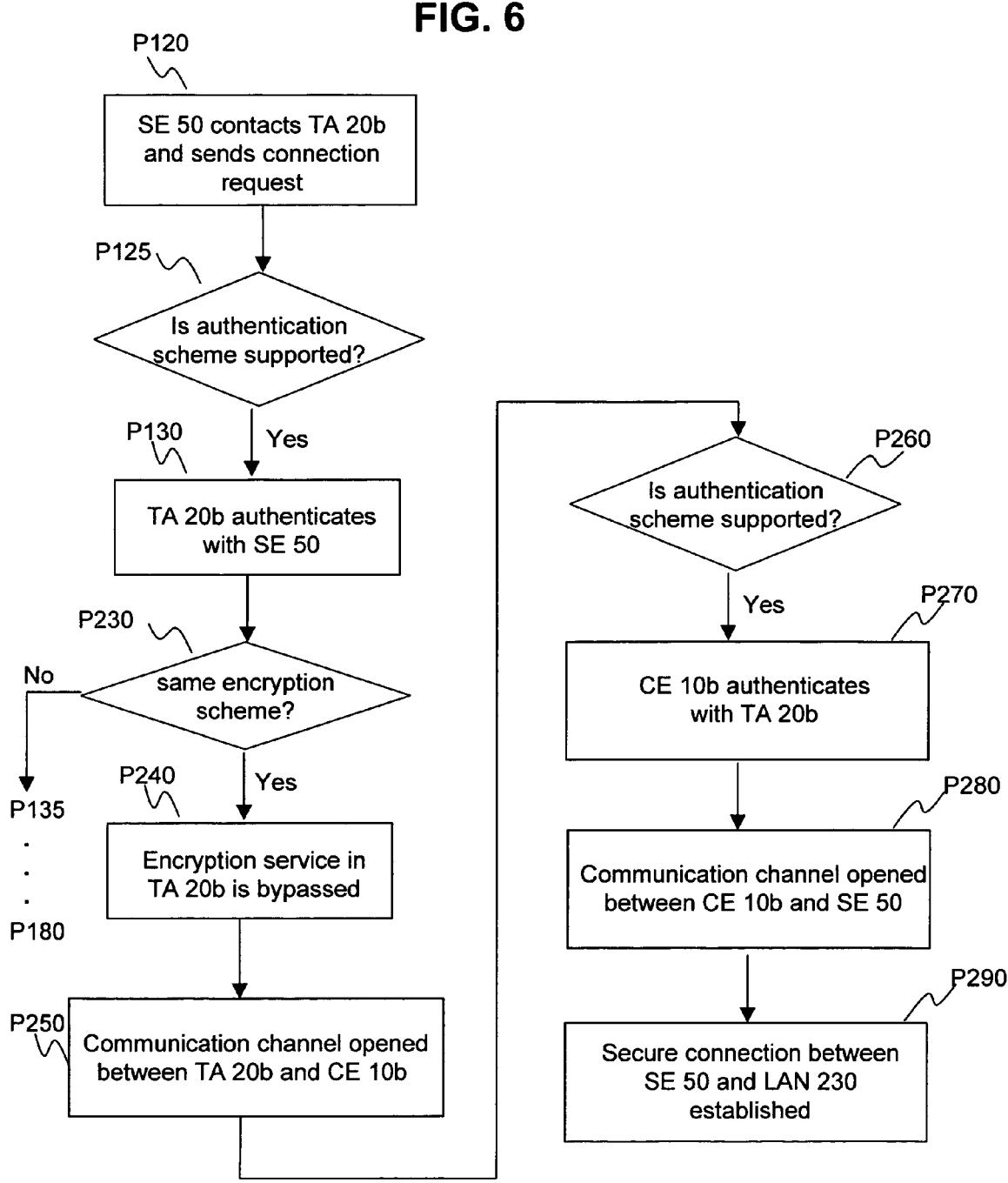
FIG. 6 shows a flow chart for another extension of a method according to an embodiment of the invention.

According to an embodiment as shown in FIG. 6, an option to avoid needless secure connections through the trusted arbitrator 20b is provided if the trusted arbitrator 20b detects that the encryption scheme employed by the source entity 50 and the encryption scheme employed by the connection entity 10b are the same. In this embodiment, the trusted arbitrator 20b merely acts as an intermediary for authenticating with the source entity 50 and with the connection entity 10b. Unlike previous embodiments, a secure connection is not first established between the source entity 50 and the trusted arbitrator 20b, and then established between the trusted arbitrator 20b and the LAN 230. Instead, the trusted arbitrator 20b acts only as a facilitator in establishing a direct secure connection between the source entity 50 and the LAN 230.

In one implementation of the embodiment shown in FIG. 6, blocks P120, P125 and P130 are carried out, wherein a connection request is sent from the source entity 50 to the trusted arbitrator 20b and authentication is performed. Then, in block P230, the trusted arbitrator 20b determines whether the source entity 50 and the LAN 230 employ the same type of encryption scheme. Such determination may be achieved by comparing the encryption scheme information in the connection request from the source entity 50 with pre-stored encryption scheme information of the LAN 230 in the trusted arbitrator 20b. Instead of comparing with pre-stored information, the trusted arbitrator 20b may obtain encryption scheme information of the LAN 230 on an as needed basis through, for example, HTTP queries and responses.

If the trusted arbitrator 20b determines that the source entity 50 and the LAN 230 do not employ the same type of encryption scheme, then steps beginning with block P135 shown in FIG. 4 are carried out according to an embodiment of the invention. However, if the trusted arbitrator 20b determines that same type of encryption scheme is employed by both, the trusted arbitrator 20b facilitates the source entity 50 and the LAN 230 in establishing a secure connection directly between them. In one embodiment, the trusted arbitrator 20b includes an encryption service that deals specifically with secure connection requests and supports multiple encryption schemes. Since the source entity 50 and the LAN 230 employ the same encryption scheme, special software residing at the source entity 50 bypasses the encryption service in the trusted arbitrator 20b, as shown in block P240. Because the encryption service is bypassed, a secure connection between the source entity 50 and the trusted arbitrator 20b is not established. Essentially, only authentication is performed between the source entity 50 and the trusted arbitrator 20b.

At the arbitrator trusted 20b side, another service allows a communication channel to be opened between the trusted arbitrator 20b and the connection entity 10b, as shown in block P250. With an open communication channel, the connection entity 10b attempts to authenticate with the trusted arbitrator 20b. In one implementation, the trusted arbitrator 20b determines whether the desired authentication scheme to be employed is supported, as shown in block P260. In block P270, if the desired authentication scheme is supported, then the trusted arbitrator 20b authenticates with the connection entity 10b using the authentication scheme. If the specific authentication scheme is not supported or is otherwise unsuccessful in implementation, then the trusted arbitrator 20b rejects the request. In one implementation, the trusted arbitrator 20b returns an error message to the source entity 50.

Once authentication is successful, the trusted arbitrator 20b sends to the connection entity 10b a message that the source entity 50 wishes to establish a secure connection with the LAN 230. In block P280, the special software that allows the encryption service to be bypassed (or other software) acts to open a communication channel between the source entity 50 and the LAN 230. In one implementation, the trusted arbitrator 20b sends a request to the connection entity 10b through the open communication channel, informing the connection entity 10b of the source entity's wish, wherein the forwarded information contains address information of the source entity 50. The connection entity 10b then sends an HTTP request for establishing a secure connection directly from the LAN 230 to the source entity 50 based on the address information. The source entity 50 responds to the request by sending an HTTP response back to the connection entity 10b, creating an open communication channel directly between the source entity 50 and the connection entity 10b.

In block P290, the open communication channel allows a secure connection to be established between the source entity 50 and the LAN 230. In one embodiment, the secure connection is established between the source entity 50 and the connection entity 10b, with encrypted data being decrypted at the connection entity 10b and the decrypted data being forwarded to the target entity 60. In another embodiment, the secure connection is established directly between the source entity 50 and the target entity 60 with the assistance of the connection entity 10b.

As described above, a method or apparatus according to an embodiment of the invention allows a secure connection to be established with an entity outside a LAN without changing the infrastructure of the LAN and while reducing monitoring costs. In one implementation, this connection is supported by communication through a trusted third-party website, thereby minimizing the risk of damage to the LAN due to breaches by unauthorized entities. The trusted third-party website further supports multiple encryption and/or authentication schemes. This allows the entity outside the LAN and an entity inside the LAN using completely different authentication and/or encryption techniques to communicate with each other.

While the description above refers to particular embodiments of the present invention, it will be understood that many modifications may be made without departing from the spirit thereof. Various modifications to these embodiments are possible, and the generic principles presented herein may also be applied to other embodiments. For example, an embodiment of the invention may use a connection entity that is implemented as any combination of (1) hardware such as a computer or a device for processing network traffic such as a router, (2) firmware loaded into non-volatile storage, and/or (3) software loaded into random-access memory in the form of machine-readable code, such code being executable by an array of logic elements such as a microprocessor or other digital signal processing unit. The connection entity may also reside on a dedicated computer or may be simply one among several tasks executing on one computer. Thus, the present invention is not intended to be limited to the embodiments shown above, but rather, is to be accorded the widest scope consistent with the principles and novel features disclosed in any fashion herein. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of supporting multiple encryption schemes over a connection on a network comprising:

transmitting a first request from a source entity to a trusted arbitrator, the first request relating at least in part to establishing a first secure connection between the source entity and a target entity, the target entity being within a local area network (LAN), the LAN coupled to the network and including a connection entity to interact with the trusted arbitrator over the network in setting up the secure connection between the source entity and the target entity;

establishing a second secure connection between the source entity and the trusted arbitrator using a first encryption scheme in response to the first request;

periodically transmitting a second request from the connection entity to the trusted arbitrator to open a third secure connection between the trusted arbitrator and one of the LAN, the connection entity, or the target entity;

transmitting a first response from the trusted arbitrator to the connection entity in response to the second request, the first response informing the connection entity that a request for the first secure connection between the source entity and the target entity exists in the trusted arbitrator; and establishing the third secure connection between the trusted arbitrator and one of the LAN, the connection entity, or the target entity using a second encryption scheme in response to the first response, to allow communication between the source entity and the target entity over the first secure connection, the first secure connection comprising the second and third secure connections.

2. The method according to claim 1, wherein the trusted arbitrator authenticates with the source entity before the second secure connection using the first encryption scheme is established.

3. The method according to claim 2, wherein the trusted arbitrator supports multiple authentication schemes and determines, before source entity is authenticated, whether a desired authentication scheme used by the source entity is supported.

4. The method according to claim 1, wherein the connection entity authenticates with the trusted arbitrator before the third secure connection using the second encryption scheme is established.

5. The method according to claim 1, wherein at least one among the second request and the first response conforms at least substantially to a Hypertext Transfer Protocol.

6. The method according to claim 1, wherein at least one among the first and second requests is directed to a Uniform Resource Locator associated with the trusted arbitrator.

7. The method according to claim 1, wherein during at least a part of a period between a time of the transmitting of the first request and a time of the transmitting of the first response, the first request is stored in an area associated with the connection entity in the trusted arbitrator.

8. The method according to claim 1, wherein if the connection entity does not receive the first response within a predetermined period of a time of the transmitting of the second request, the transmitting of the second request is repeated.

9. A computer readable medium including computer readable instructions encoded thereon for:

transmitting a first request from a source entity to a trusted arbitrator, the first request relating at least in part to establishing a first secure connection between the source entity and a target entity, the target entity being within a local area network (LAN), the LAN coupled to the network and including a connection entity to interact with the trusted arbitrator over the network in setting up the secure connection between the source entity and the target entity;

establishing a second secure connection between the source entity and the trusted arbitrator using a first encryption scheme in response to the first request;

periodically transmitting a second request from the connection entity to the trusted arbitrator to open a third secure connection between the trusted arbitrator and one of the LAN, the connection entity, or the target entity;

transmitting a first response from the trusted arbitrator to the connection entity in response to the second request, the first response informing the connection entity that a request for the first secure connection between the source entity and the target entity exists in the trusted arbitrator; and establishing the third secure connection between the trusted arbitrator and one of the LAN, the connection entity, or the target entity using a second encryption scheme in response to the first response, to allow communication between the source entity and the target entity over the first secure connection, the first secure connection comprising the second and third secure connections.

10. The computer readable medium of claim 9, further comprising computer readable instructions encoded thereon for authenticating the source entity before the second secure connection using the first encryption scheme is established.

11. The computer readable medium of claim 10, wherein the trusted arbitrator supports multiple authentication schemes and determines, before the source entity is authenticated, whether a desired authentication scheme used by the source entity is supported.

12. The computer readable medium of claim 9, further comprising computer readable instruction encoded thereon for authenticating the trusted arbitrator before transmitting the first response.

13. The computer readable medium of claim 9, wherein at least one among the second request and the first response conforms at least substantially to a Hypertext Transfer Protocol.

14. The computer readable medium of claim 9, wherein at least one among the first and second requests is directed to a Uniform Resource Locator associated with the trusted arbitrator.

15. The computer readable medium of claim 9, wherein during at least a part of a period between a time of the transmitting of the first request and a time of the transmitting of the first response, the first request is stored in an area associated with the connection entity in the trusted arbitrator.

16. The computer readable medium of claim 9, wherein if the connection entity does not receive the first response within a predetermined period of a time of the transmitting of the second request, the transmitting of the second request is repeated.

17. A system in a computer network comprising:
   a local area network (LAN) including a target entity and a connection entity coupled to the target entity;
   a trusted arbitrator coupled to the LAN via the computer network; and
   a source entity coupled to the trusted arbitrator via the computer network to transmit a first request from to the trusted arbitrator, the first request relating at least in part to establishing a first secure connection between the source entity and the target entity, wherein
   the trusted arbitrator establishes a second secure connection between the source entity and the trusted arbitrator using a first encryption scheme in response to the first request;
   the connection entity periodically transmits a second request from to the trusted arbitrator to open a third secure connection between the trusted arbitrator and one of the LAN, the connection entity, or the target entity;
   the trusted arbitrator transmits a first response to the connection entity in response to the second request, the first response informing the connection entity that a request for the first secure connection between the source entity and the target entity exists in the trusted arbitrator; and
   the trusted arbitrator establishes the third secure connection between the trusted arbitrator and one of the LAN, the connection entity, or the target entity, using a second encryption scheme in response to the first response, to allow communication between the source entity and the target entity over the first secure connection, the first secure connection comprising the second and third secure connections.

18. The system according to claim 17, wherein the trusted arbitrator authenticates with the source entity before the secure connection using the first encryption scheme is established.

19. The system according to claim 18, wherein the trusted arbitrator authenticates the source entity by verifying identification information sent by the source entity.

20. The system according to claim 18, wherein the trusted arbitrator supports multiple authentication schemes and determines, before authenticating the source entity, whether a desired authentication scheme used by the source entity is supported.

21. The system according to claim 17, wherein the connection entity authenticates with the trusted arbitrator before the third secure connection using the second encryption scheme is established.

22. The system according to claim 21, wherein the trusted arbitrator supports multiple authentication schemes and determines, before being authenticated, whether a desired authentication scheme used by the LAN is supported.

23. The system according to claim 17, wherein the first request is a query that conforms at least substantially to a Hypertext Transfer Protocol, and the first response is a response that conforms at least substantially to a Hypertext Transfer Protocol.

24. The system according to claim 17, wherein at least one among the first and second requests are directed to a Uniform Resource Locator associated with the trusted arbitrator.

25. The system according to claim 17, wherein during at least a part of a period between a time of the sending of the first request and a time of the sending of the first response, the trusted arbitrator stores the first request in an area associated with the connection entity.

26. The system according to claim 17, wherein if the connection entity does not receive the first response within a predetermined period of a time of the sending of the second request, the sending of the second request is repeated.

* * * * *